(12) United States Patent
Yanagida et al.

(10) Patent No.: US 8,591,760 B2
(45) Date of Patent: Nov. 26, 2013

(54) FERRITE MAGNETIC MATERIAL, FERRITE MAGNET, AND FERRITE SINTERED MAGNET

(75) Inventors: Shigeki Yanagida, Tokyo (JP); Takahiro Mori, Tokyo (JP); Hiroyuki Morita, Tokyo (JP); Nobuhiro Suto, Tokyo (JP); Tatsuya Katoh, Tokyo (JP); Yoshihiko Minachi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/520,270

(22) PCT Filed: Mar. 15, 2011

(86) PCT No.: PCT/JP2011/056091
§ 371 (c)(1),
(2), (4) Date: Jul. 2, 2012

(87) PCT Pub. No.: WO2011/115129
PCT Pub. Date: Sep. 22, 2011

(65) Prior Publication Data
US 2012/0280167 A1 Nov. 8, 2012

(30) Foreign Application Priority Data

Mar. 17, 2010 (JP) .................. 2010-061302
Jan. 7, 2011 (JP) .................. 2011-002288

(51) Int. Cl.
*C04B 35/26* (2006.01)
*H01F 1/11* (2006.01)

(52) U.S. Cl.
USPC .................. 252/62.63; 252/62.59

(58) Field of Classification Search
USPC .................. 252/62.59, 62.63
See application file for complete search history.

(56) References Cited

U.S. PATENT DOCUMENTS

2009/0261288 A1 10/2009 Hosokawa et al.
2009/0314981 A1 12/2009 Yanagida et al.
2011/0024672 A1 2/2011 Takami et al.

FOREIGN PATENT DOCUMENTS

| EP | 2 452 928 A1 | 5/2012 |
| JP | B2-3163279 | 2/2001 |
| JP | B2-4078566 | 2/2008 |
| JP | A-2009-296243 | 10/2009 |
| WO | WO 2007/077811 A1 | 7/2007 |
| WO | WO 2008/105449 A1 | 9/2008 |

OTHER PUBLICATIONS

Nov. 1, 2012 PCT Notification of Transmittal of Translation of the International Preliminary Report on Patentability issued in PCT/JP2011/056091.
Jul. 10, 2012 Office Action issued in Japanese Application No. 2011-002288 (with English translation).
Sep. 3, 2013 Supplementary European Search Report issued in European Application No. 11756314.8.

*Primary Examiner* — Carol M Koslow
(74) *Attorney, Agent, or Firm* — Oliff & Berridge, PLC

(57) ABSTRACT

A ferrite magnet and a ferrite sintered magnet including a ferrite magnetic material are provided. A main phase of the ferrite magnetic material includes a ferrite phase having a hexagonal crystal structure, and metal element composition expressed by Ca1-w-x-yR wSr xBayFezMm wherein $0.25 < w < 0.5$, $0.01 < x < 0.35$, $0.0001 < y < 0.013$, $y < x$, $8.7 < z < 9.9$, $1.0 < w/m < 2.1$, $0.017 < m/z < 0.055$ and Si component is at least included as a sub-component, and wherein; when content y1 mass % of the Si component in the ferrite magnetic material, with respect to $SiO_2$, is shown on Y-axis and a total content x1 of z and m is shown on X-axis, a relation between x1 and y1 is within a range surrounded by 4 points placed on X-Y coordinate having the X and Y axes.

7 Claims, 4 Drawing Sheets

(a)

(b)

FERRITE MAGNETIC MATERIAL, FERRITE MAGNET, AND FERRITE SINTERED MAGNET

TECHNICAL FIELD

The present invention relates to a ferrite magnetic material and to a ferrite magnet and a ferrite sintered magnet respectively comprising the ferrite magnetic material.

BACKGROUND ART

As for a permanent magnet material comprising oxide, hexagonal M-type (Magnetopulmbite-type) Sr ferrite or Ba ferrite are known. Ferrite magnetic material comprising such ferrites is provided as a permanent magnet in a form of ferrite sintered body or bond magnet. Recently, with a size-reduction and higher performance of electronic device, a demand for permanent magnet comprising ferrite magnetic material to have higher magnetic property, even with further reduction in size, is increasing.

As for an indicator of magnetic property shown by permanent magnet, residual flux density (Br) and coercive force (HcJ) are generally used; and it is evaluated that the higher they are the higher their magnetic property is. Conventionally, in order to increase Br and HcJ of permanent magnets, studies have been conducted by varying its composition such as by adding predetermined elements in ferrite magnetic material.

For instance, Patent Document 1 discloses an oxide magnetic material which can provide a ferrite sintered magnet having high Br and HcJ, by adding at least La, Ba and Co to M-type Ca ferrite.

Further, Patent Document 2 discloses an oxide magnetic material which can provide a ferrite sintered magnet having high Br and HcJ, by adding at least La, Sr and Co to M-type Ca ferrite. Furthermore, Patent Document 3 discloses a sintered magnet having high Br and HcJ, by adding at least Sr, La and Co to M-type Sr ferrite.

PRIOR ARTS

Patent Documents

[Patent Document 1] Japanese Patent No. 4078566
[Patent Document 2] WO Publication No. 2007/077811
[Patent Document 3] Japanese Patent No. 3163279

SUMMARY OF THE INVENTION

Problem to be Solved by the Invention

As mentioned above, in order to obtain both good Br and HcJ, although there has been instigated many attempts at variously changing combinations of elements added to main composition, it is still not obvious that which combination of the added element provide a high magnetic property.

Further, as for a permanent magnet, in addition to having high Br and HcJ, it is preferable that ratio of a value (Hk) in magnetic field when magnetization to HcJ is 90% to that of Br, i.e. squareness ratio (Hk/HcJ), is also high. When Hk/HcJ is high, demagnetization due to outer magnetic field or temperature change is small; thus a stable magnetic property can be obtained.

Therefore, it is preferable that permanent magnet using ferrite magnetic material can obtain high Br and HcJ, along with superior Hk/HcJ. However, it was not easy to obtain ferrite magnetic material which can provide a permanent magnet having such 3 magnetic properties because, for instance, when one magnetic property improved the other magnetic property deteriorated.

Further, in order to heighten Br, it is effective to align directions of an easy axis of magnetization (c-axis direction of hexagonal crystal structures, when M-type ferrite is used) of crystal grains constituting ferrite phase, namely, to improve orientation of an easy axis of magnetization and to make anisotropy form. However, when said orientation improves, with M-type ferrite, crystal grains tend to grow in a direction of a hard axis of magnetization, which is perpendicular to the an easy axis of magnetization; and thus, aspect ratio shown by a ratio of an average crystal grain size in axis of hard magnetization direction and that in an easy axis of magnetization, tends to become high. When said aspect ratio becomes high, it tends to be effected by demagnetization in crystal grains. Further, an increase of an average crystal grain size in a hard axis of magnetization direction indicates a decrease in number of crystal grains, which become a single-domain critical size (Approximately 1 μm in the case of M-type ferrite.). With these effects, HcJ tends to decrease and it becomes difficult to maintain both high Br and HcJ.

Therefore, the invention was made considering the above situations; and its object is to provide a ferrite magnetic material, which can provide permanent magnet wherein a high Br and HcJ are maintained, and in addition, a high Hk/HcJ is provided, and to provide a magnet comprising said ferrite magnetic material.

Means to Solve the Problem

In order to achieve such object, ferrite magnetic material of the present invention is a ferrite magnetic material, in which its main phase comprises ferrite phase having a hexagonal crystal structure and it is shown by a metal element composition expressed by the following formula (1), $$Ca_{1-w-x-y}R_wSr_xBa_yFe_zM_m \quad (1)$$

wherein R in formula (1) is at least one element selected from a group consisting of rare-earth element (Y is included) and Bi, which at least includes La, M in formula (1) is at least one element selected from a group consisting of Co, Mn, Mg, Ni, Cu and Zn, which at least includes Co, w, x, y, z and m in formula (1) respectively satisfies the following formulas (2), (3), (4), (5), (6), (7) and (8)

$$0.25 < w < 0.5 \quad (2)$$

$$0.01 < x < 0.35 \quad (3)$$

$$0.0001 < y < 0.013 \quad (4)$$

$$y < x \quad (5)$$

$$8.7 < z < 9.9 \quad (6)$$

$$1.0 < w/m < 2.1 \quad (7)$$

$$0.017 < m/z < 0.055 \quad (8), \text{ and}$$

Si component is at least included as a sub-component, and wherein;

when content y1 of the Si component in the ferrite magnetic material, with respect to $SiO_2$, is shown on Y-axis and total content x1 of $_z$ and $_m$ is shown on X-axis, a relation between x1 and y1 is within a range surrounded by 4 points a(8.9, 1.2), b(8.3, 0.95), c(10.0, 0.35) and d(10.6, 0.6), placed on X-Y coordinate having the X and Y axes.

Ferrite magnetic material of the present invention is shown by the above formula (1), each element satisfies formulas (2) to (8), and Si component is further included as subcomponent; characterized in that when y1 mass % of the Si component in the ferrite magnetic material, with respect to $SiO_2$, is shown on Y-axis and total content x1 of $z$ and $m$ is shown on X-axis, a relation between x1 and y1 is within a range surrounded by 4 points a(8.9, 1.2), b(8.3, 0.95), c(10.0, 0.35) and d(10.6, 0.6), placed on X-Y coordinate having the X and Y axes; and thus, a ferrite magnet or a ferrite sintered magnet having not only high Br and HcJ but also high Hk/HcJ can be obtained.

Degree of crystal orientation $Or(f)=\Sigma(001)/\Sigma(hkl)$ of the ferrite magnet or the ferrite sintered magnet, obtained by X-ray diffraction measurement, is preferably 0.9 or more.

Preferably, within a cut surface of crystal grains constituting the ferrite magnet or the ferrite sintered magnet, which is cut by a plane parallel to c-axis direction of hexagonal crystal structures, maximum and minimum values of grain size which go through a gravity center of each grains in the crystal cross-section are respectively obtained; and then, when an average of said maximum and minimum values of the sizes in crystal grains of a predetermined number or more are respectively determined as L(μm) and S(μm), said L and S satisfy the following formulas (9) and (10).

$$L \leq 1.4 \quad (9)$$

$$L/S \leq 2.4 \quad (10)$$

DESCRIPTION OF THE PREFERRED EMBODIMENTS

Figure 1:
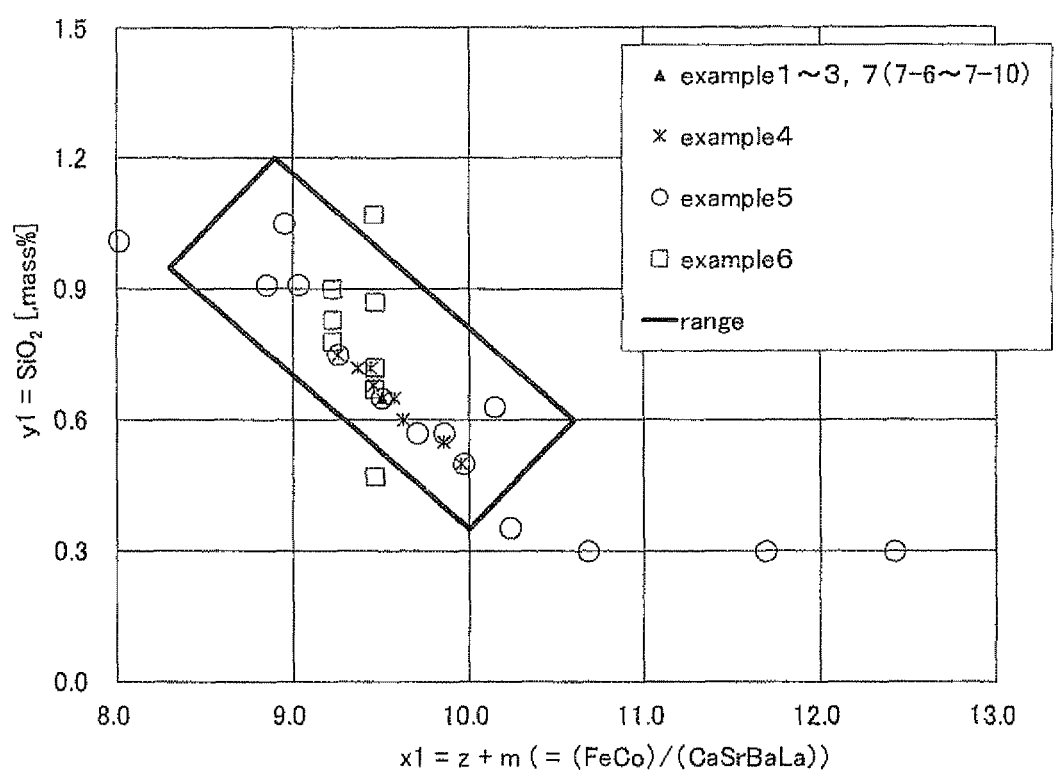
FIG. 1 is a figure showing a relation between x1 and y1 for each sample of the present examples on the X-Y coordinate having X and Y axes, when a total amount x1 of z and m is shown on X-axis and content y1 mass % of Si component with respect to $SiO_2$ in the ferrite magnetic material is shown on Y-axis.

Embodiments of the present invention will be explained hereinafter.

(Ferrite Sintered Magnet)

Ferrite magnetic material constituting ferrite sintered magnet according to an embodiment of the present invention has a main phase comprising ferrite phase having hexagonal crystal structure. As for the ferrite phase, Magnetopulmbite-type (M-type) ferrite, referred to as "M-type ferrite" hereinafter, is preferable. Note that a main phase comprising Magnetopulmbite-type (M-type) ferrite is particularly called as "M-phase". Although ferrite sintered magnet generally comprises "a main phase (crystal grains)" and "grain boundary part", "a main phase comprising ferrite phase" described here indicates "main phase" is a ferrite phase. Ratio of the main phase in sintered body is preferably 95 volume % or more.

Ferrite magnetic material constituting ferrite sintered magnet is a sintered body form as is described hereinbefore, and has a structure comprising crystal grains (main phase) and grain boundary. An average crystal grain size of crystal grains in said sintered body is preferably 1.4 μm or less, more preferably 0.5 to 1.4 μm. With such average crystal grain sizes, high HcJ can be easily obtained. Note that "average crystal grain size" is an arithmetic mean value of grain sizes in a hard axis of magnetization (a-axis) direction of crystal grains in M-type ferrite sintered body. The crystal grain size of ferrite magnetic material sintered body can be measured by scanning electron microscope.

Ferrite magnetic material according to an embodiment of the invention has a metal element composition shown by the following formula (1)

$$Ca_{1-w-x-y}R_wSr_xBa_yFe_zM_m \quad (1)$$

Note that R in formula (1) is at least one element selected from a group consisting of rare-earth element, including Y, and Bi, which at least includes La, and M is at least one element selected from a group consisting of Co, Mn, Mg, Ni, Cu and Zn, which at least includes Co.

In formula (1), w, x, y, z and m respectively shows an atomic ratio of R, Sr, Ba, Fe and M, and respectively satisfies the following formulas (2), (3), (4), (5), (6), (7) and (8).

$$0.25 < w < 0.5 \quad (2)$$

$$0.01 < x < 0.35 \quad (3)$$

$$0.0001 < y < 0.013 \quad (4)$$

$$y < x \quad (5)$$

$$8.7 < z < 9.9 \quad (6)$$

$$1.0 < w/m < 2.1 \quad (7)$$

$$0.017 < m/z < 0.055 \quad (8)$$

Further, ferrite magnetic material, as for a sub-component besides the metal element composition mentioned hereinbefore, at least includes Si component. As is shown in FIG. 1, when a content y1 mass % of the Si component in the ferrite magnetic material, with respect to $SiO_2$, is shown on Y-axis and total amount x1 of z and m is shown on X-axis, a relation between x1 and y1 is within a range surrounded by 4 points a(8.9, 1.2), b(8.3, 0.95), c(10.0, 0.35) and d(10.6, 0.6), placed on X-Y coordinate having the X and Y axes.

Note that compositional ratio of oxygen is affected by compositional ratio of each metal element and valence of each element (ion), and increases and decreases to maintain electroneutrality in crystals. Further, during the firing process described hereinafter, oxygen defect may occur when firing atmosphere is made to a reduced atmosphere.

Hereinafter, said ferrite magnetic material composition will be described in detail.

Ca atomic ratio (1-w-x-y) in metal element composition constituting the ferrite magnetic material is preferably more than 0.25 and less than 0.59. When Ca atomic ratio is too small, ferrite magnetic material may not become M-type ferrite.

Further, in addition to an increase of ratio of non-magnetic phase, such as $\alpha$-$F_2O_3$, R may exceed and different phase of non-magnetic, such as orthoferrite, may generate and magnetic properties (particularly Br and HcJ) tend to decrease. While when Ca atomic ratio is too large, in addition to not being M-type ferrite, non-magnetic phase, such as $CaFeO_{3-x}$, may increase and thus, magnetic properties may decrease.

Ferrite sintered magnet according to the present embodiment may further include the other subcomponent, in addition to an subcomponent of $SiO_2$, as is described hereinafter. For example, Ca component may be included as a subcomponent. Note that, ferrite sintered magnet according to the present embodiment includes Ca as a component constituting ferrite phase as a main phase as mentioned hereinbefore. Therefore, when Ca is included as subcomponent, for example, Ca amount analyzed from a sintered body is a total amount included in the main phase and the subcomponent. Namely, when Ca component is used as a subcomponent, Ca atomic ratio (1-w-x-y) in general formula (1) will be a value in which the subcomponents are included. Range of the atomic ratio (1-w-x-y) is determined based on a composition analyzed after sintering, and thus, it can be applied both to when Ca component is included and when Ca component is not included.

An element shown by R at least includes La. In addition to said La, at least one kind selected from a group consisting of rare-earth element, including Y, and Bi is preferable, and at least one kind selected from a group consisting of rare-earth element is more preferable. However, as for R, it is particularly preferable to include only La in order to improve anisotropy magnetic field.

Atomic ratio (w) of R in metal element composition constituting the ferrite magnetic material is more than 0.25 and less than 0.5. Within this range, Br, HcJ and Hk/HcJ can be well obtained. When atomic ratio of R is too small, solubility amount of M in ferrite magnetic material becomes insufficient, which leads to a decrease of Br and HcJ. While when too large, different phase of non-magnetic, such as orthoferrite, occur, and Hk/HcJ decreases, which becomes difficult to obtain practical magnet. With these points of view, atomic ratio of R is preferably 0.3 or more to less than 0.5, and more preferably 0.3 to 0.45.

Atomic ratio (x) of Sr is over 0.01 and less than 0.35; and within this range, Br, HcJ and Hk/HcJ can be well obtained. When atomic ratio of Sr is too small, ratio of Ca and/or La tends to become large and Hk/HcJ decreases. While when atomic ratio of Sr is too large, Br and HcJ become insufficient. With these points of view, it is preferable that atomic ratio of Sr is 0.05 to 0.25, and it is more preferable to be 0.1 to 0.2.

Atomic ratio (y) of Ba is over 0.0001 and less than 0.013; and within this range, Br, HcJ and Hk/HcJ can be well satisfied. When atomic ratio of Ba is too small, a sufficient improvement effect of Hk/HcJ cannot be obtained. While when too large, Br and Ha become inconveniently insufficient. With these points of view, it is preferable that atomic ratio of Ba is 0.0004 to 0.01.

Further, atomic ratio (x) of Sr and atomic ratio (y) of Ba satisfy a relation $y<x$. By making atomic ratio of Sr larger than that of Ba, it becomes easy to obtain sufficiently high Hk/HcJ, in addition to obtain good Br.

Atomic ratio (z) of Fe is over 8.7 and less than 9.9; and within this range, Br, HcJ and Hk/HcJ can be well satisfied. When said atomic ratio of Fe is too small or too large, Br and HcJ inconveniently decrease. It is preferable that atomic ratio of "Fe" is 8.8 to 9.6.

An element shown by M at least includes Co, and in addition, it is preferable to include at least one kind selected from a group consisting of Mn, Mg, Ni, Cu and Zn, and it is more preferable to include at least one kind selected from a group consisting of Mn, Ni and Zn. However, as for M, it is particularly preferable to include only Co in order to improve anisotropy magnetic field.

Metal element composition constituting ferrite magnetic material, considering atomic ratio (m) of M, satisfies a condition in which m/z is more than 0.017 and less than 0.055. Further, w/m satisfies a condition of being more than 1.0 and less than 2.1. By satisfying these conditions, Br, HcJ and Hk/HcJ can be well obtained. When atomic ratio of M is too small, good Br or HcJ cannot be obtained; particularly when Co ratio is too small, good HcJ cannot be obtained. While when ratio of M is too large, Br and HcJ rather tend to decrease.

With these points of view, m/z is preferably 0.02 to 0.035. Further, w/m is preferably 1.2 to 1.9, more preferably 1.4 to 1.8.

Ferrite magnetic material of the invention includes subcomponents described hereinafter, in addition to the metal element composition described hereinbefore. The subcomponents may be included in both main phase and grain boundary of ferrite magnetic material. All components in the ferrite magnetic material, except for the subcomponent, are main compositions. In order to obtain sufficient magnetic property, content ratio of main phase in ferrite magnetic material is preferably 90 mass % or more, more preferably 95 to 100 mass %.

Ferrite magnetic material of the present embodiment includes at least Si (silicon) component as a subcomponent. Here, the Si component includes both Si atom itself and a mixture including Si, such as $SiO_2$. As for Si-included mixture, $SiO_2$, $Na_2SiO_3$, $SiO_2.nH_2O$, etc. can be exemplified, although it is not particularly limited if it has a composition including Si. When Si component is included in ferrite magnetic material, sintering ability becomes good and crystal grain size of sintered body will be suitably adjusted; and thus, magnetic properties of the ferrite sintered magnet will be well controlled. And as a result, high Hk/HcJ can be obtained while maintaining good Br and HcJ.

Ferrite magnetic material of the present embodiment, as is shown in FIG. 1, when y1 mass % of the Si component in the ferrite magnetic material, with respect to $SiO_2$, is shown on Y-axis and total amount x1 of z and m is shown on X-axis, a relation between x1 and y1 is within a range surrounded by 4 points a(8.9, 1.2), b(8.3, 0.95), c(10.0, 0.35) and d(10.6, 0.6), placed on X-Y coordinate having X and Y axes.

When a relation of x1 and y1, namely a relation of Si component ratio and a total amount of z and m, is within said range, good Br, HcJ and Hk/HcJ can be obtained. When content amount of Si component is too large, a large amount of non-magnetic Si component will be included in ferrite sintered magnet; and there is a tendency to decrease magnetic properties, particularly Br. While when Si component is too small, good effects mentioned hereinbefore cannot be obtained; and that HcJ tends to decrease.

Total content amount of Si component in ferrite magnetic material of the invention, with respect to $SiO_2$, is preferable 0.35 to 1.2 mass %, more preferably 0.4 to 1.1 mass %. When content amount of Si component is within the above range, a high HcJ can be obtained.

Although ferrite magnetic material comprises the metal element composition and the subcomponent at least including Si component, the ferrite magnetic material composition can be measured by a fluorescence X-ray quantitative analysis. Further, existence of main phase can be confirmed by X-ray diffraction or electron diffraction.

Ferrite magnetic material of the present embodiment may include a component other than Si component as a subcomponent. As for the other subcomponent, Al and/or Cr can be included, for instance. With these components, HcJ of ferrite sintered magnet tends to increase. In terms of obtaining a good enhancing effect of HcJ, content amount of Al and/or Cr, with respect to $Al_2O_3$ or $Cr_2O_5$, is preferably 0.1 mass % or more of the total ferrite magnetic material. Note that these components may decrease Br of ferrite sintered magnet; therefore, 3 mass % or less is preferable in terms of obtaining good Br.

As for a subcomponent, boron B can be included as $B_2O_3$, for instance. By including B, pre-calcining temperature when obtaining ferrite magnetic material and firing temperature when obtaining sintering body of ferrite magnetic material can be decreased, which lead to increased productivity of ferrite sintered magnet. However, when B is too large, saturated magnetization of ferrite sintered magnet may decrease. Thus, content amount of B of the total ferrite magnetic material, with respect to $B_2O_3$, is preferably 0.5 mass % or less.

Furthermore, ferrite magnetic material of the present embodiment may include Ga, Mg, Cu, Mn, Ni, Zn, In, Li, Ti, Zr, Ge, Sn, V, Nb, Ta, Sb, As, W, Mo, etc. in an oxide form as subcomponent. Content amounts thereof are preferably, with respect to oxides of stoichiometric composition for each atom, 5 mass % or less of gallium oxide, 5 mass % or less of magnesium oxide, 5 mass % or less of copper oxide, 5 mass % or less of manganese oxide, 5 mass % or less of nickel oxide, 5 mass % or less of zinc oxide, 3 mass % or less of indium oxide, 1 mass % or less of lithium oxide, 3 mass % or less of titanium oxide, 3 mass % or less of zirconium oxide, 3 mass % or less of germanium oxide, 3 mass % or less of tin oxide, 3 mass % or less of vanadium oxide, 3 mass % or less of niobium oxide, 3 mass % or less of tantalum oxide, 3 mass % or less of antimony oxide, 3 mass % or less of arsenic oxide, 3 mass % or less of tungsten oxide and 3 mass % or less of molybdenum oxide. However, when a combination of multiple kinds thereof is included, in order to avoid a decrease of magnetic properties, it is desirable that a total amount thereof is 5 mass % or less.

Ferrite magnetic material of the present embodiment is preferable not to include alkali metal element, such as Na, K, Rb, etc., as subcomponent. Alkali metal element tends to decrease saturated magnetization of magnet 1. However, alkali metal element may be included in raw materials of ferrite magnetic material; and thus, it can be included in the ferrite magnetic material at inevitably included amount. Content amount of the alkali metal element which does not largely affect magnetic properties is 3 mass % or less.

(Degree of Crystal Orientation of Ferrite Sintered Magnet)

Ferrite sintered magnet according to the present embodiment, degree of crystal orientation Or(f)=Σ(001)/Σ(hkl) measured by X-ray diffraction (XRD) is preferably 0.9 or more, and more preferably 0.92 or more.

Measuring method of degree of the crystal orientation Or(f) will be described hereinafter. First, for instance, one surface of circular plated or cylindrical molded ferrite sintered magnet is polished smoothly, XRD measurement is performed on the smoothly polished surface, and by obtaining diffraction patterns, diffraction peak derived from ferrite sintered magnet will be identified. And then, degree of crystallographic orientation (degree of X-ray) of ferrite sintered magnet will be obtained from plane indices and peak strength of the diffraction peaks.

Note that, in the present invention, degree of crystal orientation of ferrite sintered magnet is determined as Or(f)=ΣI(00L)/ΣI(hkL). (00L) in the formula is an indication collectively referred to as c-plane (a plane perpendicular to c-axis) in crystal structure, such as (004), (006), etc. ΣI(00L) indicates a total of all the peak strength toward (00L) surface. Further, (hkL) indicates all the detected diffraction peaks, and ΣI(hkL) is a total of peak strength thereof.

Further, c-plane indicated by (00L) is a plane perpendicular to an easy axis of magnetization direction in ferrite sintered magnet of the present embodiment. The higher the total peak strength of (00L) plane is, namely, the higher the Or(f)= ΣI(00L)/ΣI(hkL) is, axes of easy magnetization will be aligned crystallographically, and thus, Br will be improved.

(Crystal Grains of Ferrite Sintered Magnet)

Figure 2:
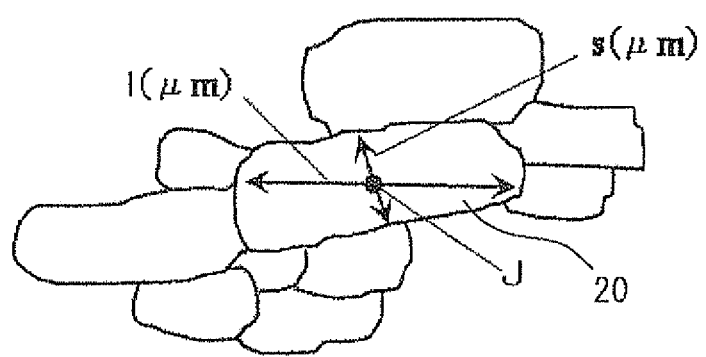
FIG. 2 is a sectional view of crystal grains describing a measuring method respectively of crystal grain sizes and aspect ratio of crystal grains constituting ferrite sintered magnet according to one embodiment of the invention.

Ferrite sintered magnet according to the present embodiment, as is shown in FIG. 2, is constituted from crystal grains having elliptical cross-section. In a cut surface cut by a plane parallel to c-axis direction of hexagonal crystal structures, of the crystal grains constituting ferrite sintered magnet according to the present embodiment, maximum and minimum values of grain sizes which go through a gravity center of each grains in the crystal cross-section are respectively obtained; and then, when an average of a predetermined number or more of crystal grains is determined as L(μm), S(μm), said L and S preferably satisfy the following formulas (9) and (10).

$$L \leq 1.4 \tag{9}$$

$$L/S \leq 2.4 \tag{10}$$

As for a range of L, L≤1.37 is preferable, and 0.6≤L≤1.37 is more preferable. As for a range of L/S, L/S≤2.35 is preferable, and 1.7≤L/S≤2.35 is more preferable.

Said L/S is a parameter often called as aspect ratio. When degree of orientation in M-type ferrite become high, crystal grains tend to grow in a direction of a hard axis of magnetization (a-axis of hexagonal crystal structure, S direction in FIG. 2), which is perpendicular to an easy axis of magnetization (c-axis of hexagonal crystal structure, L direction in FIG. 2) direction. Therefore, aspect ratio, which shows a ratio of an average crystal grain size in the direction of a hard axis of magnetization direction and that of an easy axis of magnetization direction, is easy to become higher. And then, when said aspect ratio become high, it becomes easy to be affected by demagnetization in crystal grains. Further, an increase of average crystal grain size in the direction of a hard axis of magnetization direction indicates decrease of crystal grain numbers, which become single-domain critical size (approximately 1 μm in the case of M-type ferrite). With these influences, HcJ tends to decrease, and it becomes difficult to obtain both high Br and high HcJ.

However, according to ferrite magnetic material of the present embodiment, both high Br and high HcJ can be maintained by satisfying conditions shown by the above formulas (9) and (10).

Figure 3:
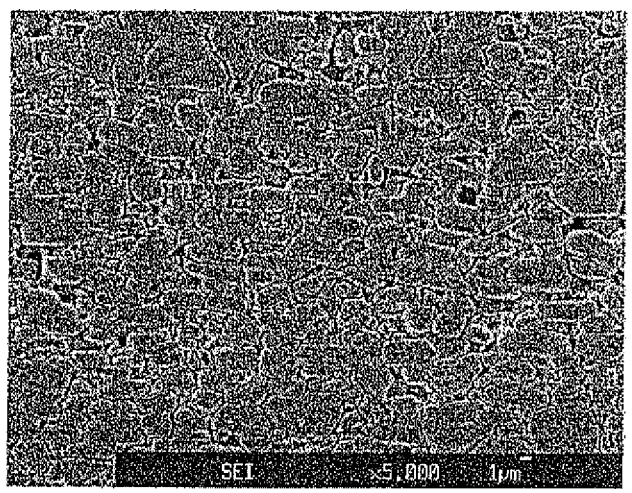
FIG. 3(A) is a sectional. SEM picture of a ferrite sintered magnet according to an example of the invention.
FIG. 3(B) is a sectional SEM picture of a ferrite sintered magnet according to a relative example of the invention.
Figure 3:
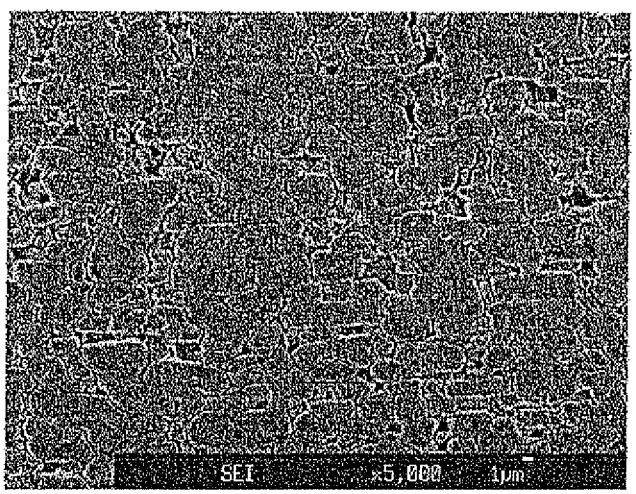

Hereinafter, an average maximum grain size L and an average minimum grain size S will be described in detail by referring FIGS. 2 and 3. M-type ferrite, as is mentioned above, has an easy axis of magnetization in c-axis direction of hexagonal crystal structures. Therefore, in order to measure average maximum grain size L and average minimum grain size S, a cross-section parallel to c-axis direction of hexagonal crystal structures, of ferrite sintered magnet is cut out. Next, mirror polishing and etching treatment by hydrofluoric acid were performed to the cross-section. Crystal grain boundary part is removed by the etching treatment, which makes observation of crystal grains easy. Next, the cross-section is observed by scanning electron microscope (SEM) and grain sectional image parallel to c-axis direction of hexagonal crystal structures, will be observed. An example of the obtained cross-sectional image will be shown in FIG. 3(a).

Subsequently, an image analysis process is performed to grain sectional image, and for each crystal grains, maximum and minimum values of crystal grains, which go through a gravity center of the grain cross-section are respectively measured. In the present embodiment, as is shown in FIG. 2, maximum grain size 1 (μm), which is a maximum value of a grain size going through gravity center J of grain cross-section of one crystal grain 20, and minimum grain size s(μm), which is a minimum value of a grain size going through gravity center J of grain cross-section of one crystal grain 20, are respectively obtained.

Then, arithmetic mean value respectively of the maximum grain size and the minimum grain size with a predetermined number of crystal grains are calculated; and then, they were respectively determined as average maximum grain size L and average minimum grain size S. Note that a predetermined number of crystal grains in order to obtain the mean value is preferably 500 or more.

Further, as for a magnet comprising ferrite magnetic material of the present embodiment, it is not limited to the aforementioned ferrite sintered magnet, and such as bond magnet, in which ferrite magnetic material powder is combined with binder, can be exemplified.

In case of the bond magnet, the aforementioned conditions of ferrite magnetic material can be satisfied with ferrite magnetic material powder. An average particle size of ferrite magnetic material powder is not particularly limited; however, 2 μm or less is preferable, 1.5 μm or less is more preferable, and 0.1 to 1 μm is further preferable. When this average particle size is too large, a ratio of multi-domain particles in the powder become higher, and HcJ is likely to decrease. While when the average particle size is too small, magnetic property decreases by thermal disturbance, and orientation and formability may decrease when molding in a magnetic field.

As for a binder, nitrile rubber (e.g. NBR rubber), chlorinated polyethylene, polyamide resin (e.g. nylon 6®, nylon 12®), etc. can be exemplified.

(Manufacturing Method of Ferrite Sintered Magnet)

In the embodiment below, an example of manufacturing method of ferrite sintered magnet comprising ferrite magnetic material is shown. In the present embodiment, ferrite sintered magnet can be manufactured through processes of mixing process, calcining process, milling process, molding process and firing process. Further, drying and kneading processes of milled slurry may be included between the milling process and the molding process. Degreasing process may be included between the molding process and the firing process. Each process will be described below.

<Mixing Process>

In the mixing process, raw materials of ferrite magnetic material are mixed to obtain raw material mixture. As for a raw material of ferrite magnetic material, compound (raw material compound) comprising one or two element constituting the raw material can be exemplified. As for a raw material compound, such as powder form is preferable. As for the raw compound, an oxide of each element or a compound (carbonate, hydroxide, nitrate, etc.) which become an oxide after firing can be exemplified. For instance, $SrCO_3$, $La(OH)_3$, $Fe_2O_3$, $BaCO_3$, $CaCO_3$, $Co_3O_4$, etc. can be exemplified. An average particle size of raw material compound powder is approximately 0.1 to 2.0 μm is preferable, in view of obtaining a uniform mixture, for instance.

As for a raw material of Si component in ferrite magnetic material, $SiO_2$ can be exemplified, however, it is not particularly limited, if they are compounds including Si. Further, as for a raw material powder, raw material compound (an element alone, an oxide, etc.) of the other subcomponent can be mixed when necessary.

As for the mixture, for instance, each raw material were weighed to obtain a composition of the desired ferrite magnetic material, mixed, and then, mixed and milled for approximately 0.1 to 20 hours by using such as wet-attritor and ball mill.

Note that, all the raw materials are not necessary to be mixed in the mixing process, and a part of the materials can be added after the below-mentioned calcining process. For instance, raw material of Si (e.g. $SiO_2$) as subcomponent and raw material of Ca (e.g. $CaCO_3$) as constituting element of metal element composition can be added during milling (particularly fine-milling) process after the below-mentioned calcining process. Timing of the addition can be adjusted in order to easily obtain the desired composition and magnetic property.

<Calcining Process>

In calcining process, mixture obtained by the mixing process are calcined. Calcination is preferably performed in oxidizing atmosphere, such as air. The calcination temperature is preferably within the range of 1100 to 1400° C., more preferably 1100 to 1300° C., further more preferably 1150 to 1300° C. The stabilizing time at the calcination temperature can be 1 sec. to 10 hours, preferably 1 sec. to 5 hours. Calcined body obtained by the calcination comprises 70% or more of the aforementioned main phase (M-phase). Initial particle size of the calcined body is preferably 10 μm or less, more preferably 5 μm or less, further more preferably 2 μm or less.

<Milling Process>

In the milling process, the granular or massive calcined body after calcining process is milled to reproduce a powdery form. With this process, it becomes easy to form in the molding process described hereinafter. With this milling process, raw material, which was not mixed in the mixing process, can be added (after adding raw materials) as is mentioned hereinbefore. The milling process, for example, can be performed in a two-step process, in which calcined body is milled (coarse-milling) to make a coarse powder, and then, further finely milled (fine-milling).

The coarse milling is performed by using such as vibrational mill until an average particle size becomes 0.5 to 5.0 μm. The fine milling is performed by further pulverizing the coarse milled material obtained from the coarse milling by wet-attritor, ball mill, jet mill, etc. In the fine milling, fine milling is performed until an average particle size of the obtained fine milled material become preferably approximately 0.08 to 2.0 μm, more preferably approximately 0.1 to 1.0 μm, furthermore preferably approximately 0.1 to 0.5 μm. Specific surface area (obtained such as by BET method) of fine milled material is preferably approximately 4 to 12 m$^2$/g. Preferable time for the pulverizing varies according to the used pulverizing method. For instance, approximately 30 min. to 20 hours are preferable for a wet-attritor and 10 to 50 hours are preferable for a wet-milling by a ball mill.

When adding a part of raw material in the milling process, for example, addition can be performed during the fine milling. In the present embodiment, $SiO_2$ as Si component or $CaCO_3$ as Ca component may be added during the fine milling, however, they may also be added during the mixing process or the coarse milling process.

In the fine milling process, non-aqueous solvent, such as toluene and xylene in addition to water, can be used as a dispersant in case of a wet process. There tends to obtain a high orientation during the wet formation described hereinafter, when using the non-aqueous solvent. On the other hand, the aqueous solvent is preferably used in view of productivity.

Further, in the fine milling process, in order to increase degree of orientation of the sintered body after firing, polyalcohol shown by a general formula such as $C_n(OH)_nH_{n+2}$ may be added. Here, as for the polyalcohol, n in the general formula is preferably 4 to 100, more preferably 4 to 30, furthermore preferably 4 to 20, and particularly preferably 4 to 12. As for the polyalcohol, sorbitol can be exemplified. Further, polyalcohol of two or more kinds can be used. Furthermore, in addition to the polyalcohol, combined usage of the other well-known dispersants is possible.

When adding the polyalcohol, the additional amount is, with respect to adding object (e.g. coarse milled material), preferably 0.05 to 5.0 mass %, more preferably 0.1 to 3.0 mass % and furthermore preferably 0.2 to 2.0 mass %. Polyalcohol added during the fine milling process is removed by heat decomposition during firing process mentioned hereinafter.

Note that, as for a molding method of the milled material (preferable the fine milled material), when using the following CIM (Ceramic Injection Molding), namely PIM (Powder Injection Molding), the addition of polyalcohol such as sorbitol during drying the milled slurry may become a cause for a remarkable occurrence of powder aggregation or for a powder dispersant in binder resin, which is not preferable. In this case, no dispersant may be added or powder may be surface treated by a dispersant comprising hydrophilic group and hydrophobic (lipophilic) group in a same molecule, such as silane coupling agent. Additional amount of the dispersants may be 0.3 to 3.0 mass % with respect to adding object (e.g. coarse milled material). Although these dispersants are preferably added to the fine milled slurry and mixed, it is not particularly limited the example and said dispersants can be added after drying or during kneading process with a binder resin.

<Molding-Firing Process>

In the molding-firing process, after molding the milled material (preferably fine milled material) obtained after the milling process and obtaining molded body, the molded body is fired to obtain sintered body. Molding can be performed with dry molding, wet molding or CIM. In the case of dry molding method, for instance, magnetic field is applied during pressure molding the dried magnetic powder, obtaining the molded body, and then the molded body is fired. In the case of the wet molding method, for instance, slurry including magnetic powder is pressure molded in a magnetic field, a liquid component is removed, obtaining a molded body, and then the molded body is fired.

Note that, in general, with the dry molding method, dried magnetic powder is pressed in a mold and that a required time for molding process is short, which is preferable. However, an improvement of degree of orientation of magnetic powder in a magnetic field during the molding is difficult; thus, magnetic properties of the resultant sintered magnet is inferior to that of the sintered magnet obtained from the wet molding method. Further, with the wet molding method, although magnetic powder tends to orientate by magnetic field when molding and magnetic properties of the sintered magnet are good, there remains a problem that it takes time for molding since liquid components must be withdrawn when applying pressure.

Further, CIM is a method wherein a dried magnetic powder is heat kneaded together with a binder resin the pellet is formed, a preliminary molded body is obtained by injection molding the pellet in a mold where magnetic field is applied, and firing after removing binder treatment is applied to the preliminary molded body.

Molding method of ferrite magnetic material according to the aforementioned embodiment is not particularly limited; however, CIM and wet molding are preferable, and CIM is particularly preferable. CIM and wet molding will be described below in detail.

(CIM-Firing)

When obtaining ferrite sintered magnet by CIM method, after a wet milling, the milled slurry including magnetic powder is dried. Drying temperature is preferably 80 to 150° C., more preferably 100 to 120° C. Drying time is preferably 1 to 40 hours, more preferably 5 to 25 hours. An average particle size of initial magnetic powder after drying is preferably within a range of 0.08 to 2 μm, more preferably within a range of 0.1 to 1 μm.

The dried magnetic powder is kneaded together with binder resin, waxes, smoothing agent, plasticizing agent, sublimation compound, etc. (referred to as organic component hereinafter), and then formed to a pellet by such as pelletizer. The organic component is included in the molded body preferably by 35 to 60 volume %, more preferably 40 to 55 volume %. Kneading can be performed such as by kneader, etc. As for the pelletizer, for instance, a Twin Screw Extruder can be used. The kneading and pelletizing can be performed by heating, depending on melting temperature of used organic component.

As for a binder resin, a high-molecular compound such as thermoplastic resin can be used. As for a thermoplastic resin, polyethylene, polypropylene, ethylene-vinyl acetate copolymer, atacticpolypropylene, acrylic polymer, polystyrene, polyacetal, etc. are used.

As for the waxes, other than natural waxes such as carnauba wax, montan wax and bees wax, synthetic waxes such as paraffin wax, urethane wax and polyethylene glycol are used.

As for a smoothing agent, such as fatty acid ester may be used, and as for the plasticizing agent, such as phthalate ester may be used.

An additional amount of the binder resin is preferably 3 to 20 mass %, an additional amount of waxes is preferably 3 to 20 mass % and an additional amount of smoothing agent is preferably 0.1 to 5 mass %, with respect to 100 mass % of magnetic powder. An additional amount of plasticizing agent is preferably 0.1 to 5 mass % with respect to 100 mass % of binder resin.

Figure 4:
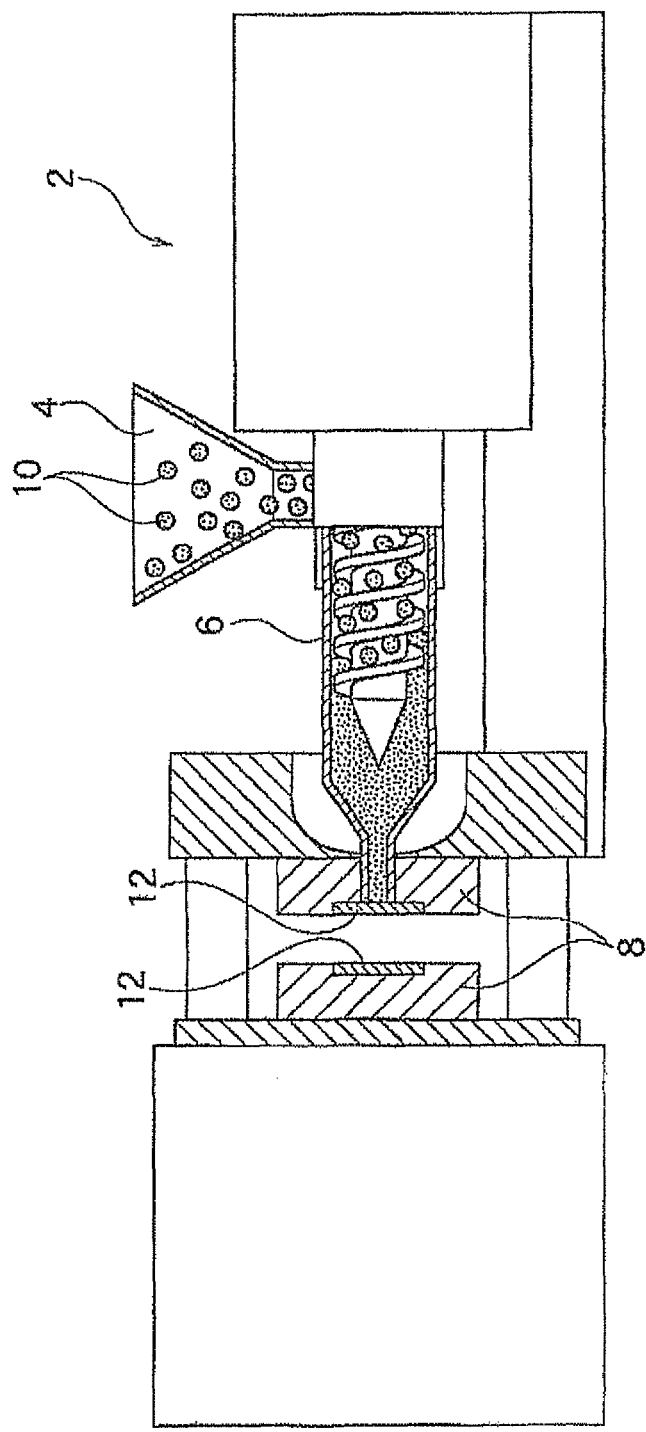
FIG. 4 is a sectional view of a main part of magnetic field injection machine, used for a manufacturing sintered magnet according to an embodiment of the invention.

In the present embodiment, for instance, pellet 10 is injection molded in the mold 8 field injection molding device 2 in a magnetic field as is shown in FIG. 4. Before the injection in the mold 8, the mold 8 is closed, cavity 12 is molded inside the mold 8, and magnetic field is applied in the mold 8. Note that pellet 10 is entered from a portion 4 to extruder 6 and heat melted to such as 160 to 230° C. inside extruder 6 and injected in cavity 12 of mold 8 by a screw. Temperature of the mold 8 is 20 to 80° C. Applied magnetic field to mold 8 is approximately 398 to 1592 kA/m (5 to 20 kOe).

Next, the preliminary molded body obtained by CIM is heat treated at 100 to 600° C. in air or in nitrogen; and binder removing treatment is performed to obtain a molded body. When binder treatment is insufficient or heating rate is rapid when removing binder, breaks or cracks may occur in a molded body or a sintered body due to a rapid volatilization or an occurrence of decomposition gas of the aforementioned organic components. Therefore, depending on the organic components used for removing binder, heating rate within a temperature range, in which volatilization or decomposition is performed, can be suitably adjusted to a slow heating rate such as 0.01 to 1° C./min., and then binder may be removed. On the other hand, when binder is excessively removed, shape retention of the molded body become insufficient and chip may be molded; therefore, it is required to control heat treatment temperature or temperature profile. Further, when several kinds of organic components are used, removing binder treatment can be performed for a several times.

Next, in the sintering process, molded body after the binder treatment is sintered in air preferably at 1100 to 1250° C., and more preferably 1160 to 1230° C. for approximately 0.2 to 3 hours, and then ferrite sintered magnet of the present invention is obtained. When temperature is too low or temperature holding time is too short, desired magnetic properties cannot be obtained due to the following reasons, such as sufficient density of the sintered body cannot be obtained or reaction of the added element is insufficient. Further, when firing temperature is too high or temperature holding time is too long, desired magnetic properties cannot be obtained as well, due to reasons such as abnormal growth of crystal grains or an occurrence of different phase other than M-type ferrite. Note that the firing process can be performed consecutively with binder removing process or the firing can be performed once the temperature is cooled to a room temperature after the binder removing treatment.

(Wet Molding-Firing)

When a ferrite sintered magnet is obtained by a wet molding method, for instance, it is preferable that slurry is obtained by the aforementioned fine milling process by wet process; subsequently slurry for a wet molding is obtained by concentrating said slurry to a predetermined concentration; and then molding is performed using the slurry thereof. The slurry concentration may be performed by such as a centrifugation or a filter press. Slurry for wet molding, fine milled material is preferably around 30 to 80 mass % with respect to the total amount. In the slurry, water is preferable for a dispersant dispersing fine milled material. In this case, surface acting agents, such as gluconic acid, gluconate and sorbitol, may be added to the slurry. Non-aqueous solvent may be used for the dispersant. Organic solvents such as toluene, xylen, etc. may be used as the non-aqueous solvent. In this case, it is preferable that surface acting agent such as oleic acid is added. Note that slurry for wet molding may be adjusted by adding such as dispersant to dried fine milled material after the fine milling.

In the wet molding, said slurry for wet molding is then molded in a magnetic field. In this case, molding pressure is preferably around 9.8 to 49 MPa (0.1 to 0.5 ton/cm$^2$) and applied magnetic field may be around 398 to 1592 kA/m. Further, pressure applied direction and magnetic applied direction when molding may be the same or orthogonal direction.

Firing of the molded body by the wet molding may be performed in oxidizing atmosphere such as air. Firing temperature is preferably 1050 to 1270° C. and more preferably 1080 to 1240° C. Further, firing time (holding time of the firing temperature) is preferably 0.5 to 3 hours.

Note that when molded body is obtained by the aforementioned wet molding and when said molded body is rapidly heated by firing without sufficiently drying, volatilization such as of dispersant vigorously occur and a cracks may appear in the molded body. Therefore, in order to avoid such inconvenience, it is preferable to prevent occurrence of cracks such as by sufficiently drying the molded body by heating in a slow heating rate, such as 0.5° C./min., from room temperature to approximately 100° C. Further, when adding such as surface acting agent (dispersant), it is preferable to sufficiently remove them (degreasing treatment) by heating in a heating rate such as approximately 2.5° C./min. within a temperature range of approximately 100 to 500° C. Note that these treatments may be performed in the beginning of the firing process or separately before the firing process.

Although suitable manufacturing method of the ferrite sintered magnet is described hereinbefore, as long as ferrite magnetic material of the present invention is used, manufacturing method is not particularly limited to the above and conditions thereof can be suitably varied.

Further, as for a magnet, when manufacturing a bond magnet rather than a ferrite sintered magnet, for instance, the obtained milled material and binder are mixed after the aforementioned milling process and molded in a magnetic field, and then bond magnet including ferrite magnetic material powder of the invention can be obtained. Alternatively, bond magnet can be obtained by heat treating ferrite magnetic material powder, manufactured by drying slurry obtained from the milling process, at a temperature such as around 1000 to 1200° C. wherein sintering does not occur, and then fractured magnetic powder and binder are mixed such as by atomizer.

Formation of the magnet obtained from the present invention is not particularly limited if it is manufactured from ferrite magnetic material of the present invention. For instance, ferrite magnet may have various shapes such as arc segment shape having anisotropy, plate shape, cylindrical shape, etc. Note that the arc segment shape is a shape in which plate shape is arc-like curved in one-way. According to the ferrite magnetic material of the present invention, regardless of magnet shape, high Hk/HcJ can be obtained while maintaining high Br and HcJ. Particularly, even with arc segment shaped magnet, high Hk/HcJ can be obtained while maintaining high Br and HcJ.

Ferrite magnet according to the present embodiment may be used for a member of automotive motors, such as fuel pump, power window, ABS (Antilock Brake System), fan, wiper, power steering, active suspension, starter, door lock, electronic mirror, etc.

Further, it may be used for a motor member for OA/AV equipments such as FDD spindle, VTR capstan, VTR rotary head, VTR reel, VTR loading, VTR camera capstan, VTR camera rotary head, VTR camera zoom, VTR camera focus, capstan such as radio-cassette recorder, CD/DVD/MD spindle, CD/DVD/MD loading, CD/DVD optical pickup, etc.

Further, it may be used for a motor member for household electrical appliances such as air-conditioning compressor, freezer compressor, driving electric tools, drier fan, driving shaver, electric toothbrush, etc. Furthermore, it may be used for a motor member for FA electrical appliances such as for robot-shaft, join-driven, robot main driven, machine accessory table-driven, machine accessory belt-driven, etc. As for the other intended purpose, members such as motorcycle generator, speaker, headphone magnet, magnetron tube, magnetic field generator for MRI, clamper for CD-ROM, distributor sensor, ABS sensor, fuel-oil level sensor, magnet latch, isolator, etc. can be exemplified. Alternatively, magnetic layers of magnetic recording medium can be used a target (pellet) when molding such as by evaporation method or sputtering method.

EXAMPLES

Below, although the present invention will be specified based on precise examples, the present invention is not limited to these examples.

Examples 1 to 61

<Mixing Process>

First, as for starting raw material, metal element mixture powder constituting ferrite sintered magnet was prepared. As for the starting raw material, iron oxide ($Fe_2O_3$; including Mn, Cr, Al, Si and Cl as impurity), lanthanum hydroxide ($La(OH)_3$), calcium carbonate ($CaCO_3$), strontium carbonate (SrCO$_3$), barium carbonate (BaCO$_3$) and cobalt oxide (Co$_3$O$_4$) were prepared and weighed to become compositions of each sample as described in Tables 1 to 6. Further, as for Si component raw material, silicon oxide (SiO$_2$, moisture content; approximately 20%, the same raw material was used hereinafter.) was weighed to become compositions of each sample with respect to the total amount of starting raw material as described in Tables 1 to 6.

Note that samples were manufactured by respectively varying Sr ratio (x) and Ca ratio (1-w-x-y) in Example 1 (Table 1), La ratio (w) and La/Co ratio (w/m) in Example 2 (Table 2), Ba ratio (y) in Example 3 (Table 3), Co/Fe ratio (m/z) in Example 4 (Table 4), Fe ratio (z) in Example 5 (Table 5) and SiO$_2$ content in Example 6 (Table 6).

<Calcining Process>

Powders of the starting raw material and SiO$_2$ were mixed by a wet-attritor, milled and obtained slurry raw material mixture. This raw material mixture was dried, and then calcined in air at 1225° C. for 2 hours to obtain calcined body.

<Milling Process>

The obtained calcined body was coarse milled by small sized lot vibrational mill to obtain a coarse milled material. In order to make ratio of metal element constituting ferrite sintered magnet after firing as is shown in each sample value described in Tables 1 to 6, iron oxide (Fe$_2$O$_3$; including Mn, Cr, Al, Si and Cl as impurity), calcium carbonate (CaCO$_3$), strontium carbonate (SrCO$_3$), cobalt oxide (CO$_3$O$_4$) and silicon oxide (SiO$_2$) as subcomponent were respectively and suitably added together with 0.45 wt % of sorbitol to the obtained coarse milled material. Next, it was fine milled by a wet ball mill, in order to make specific surface area (SSA) obtained by BET method to 8.0 to 9.0 m$^2$/g; and then slurry was obtained. The obtained slurry was dried, granulated, and then ferrite material powder was obtained.

<Molding-Firing Process>

Molding was performed by CIM. First, ferrite material powder, PP (polypropylene used as binder resin), paraffin wax, acrylic resin and DOP (dioctyl phthalate used as plasticizing agent) respectively obtained by the aforementioned method were prepared, and then they were respectively weighed so that ferrite material powder=87 mass %, PP=5.1 mass %, paraffin wax=5.1 mass %, acrylic resin=1 mass % and DOP=2 mass %. Next, they were kneaded by a pressurized and heated kneader at 165° C. for 2.5 hours. And the kneaded material (mixture) was molded to a pellet shape by pelletizer and pellet 10 as shown in FIG. 4 was obtained.

Next, by using magnetic field injection molding device 2 shown in FIG. 4, pellet 10 was injection molded in mold 8. Before the injection in mold 8, cavity 12 was molded inside, and magnetic field was applied in mold 8. Note that pellet 10 was heat melted inside of extruder 6 and injected in cavity 12 of mold 8 by screw. Temperature of injection was 185° C., mold temperature was 40° C., and applied magnetic field when injecting was 1273 kA/m. A preliminary molded body obtained by a magnetic field injection molding process was circular shape with diameter of 30 mm and thickness of 3 mm.

Removing wax treatment was performed to the preliminary molded body by heat treating for a total of 50 hours at the highest achieving temperature of 230° C. in humidified air atmosphere. Removing binder treatment was performed to the wax removed molded body in air with a slow heating rate from 150 to 500° C. Subsequently, firing was performed at 1190 to 1230° C. for one hour in air and obtained a ferrite sintered magnet.

Example 7

In example 7, except for changing a volume percentage of organic component in the molded body as is shown in Table 7 in molding process, ferrite sintered body was obtained as is the same with examples 1 to 6. Note that the organic component is a total of PP(polypropylene), paraffin wax, acrylic resin and DOP(dioctyl phthalate); and mixture ratios of PP, paraffin wax, acrylic resin and DOP were made constant as is shown in example 1 even when the organic component ratio in the molded body varied.

In example 7, by varying volume percent of organic component in the molded body, degree of crystal orientation, crystal grain size and aspect ratio of sintered magnet were varied.

Example 8

In example 8, except for not adding sorbitol in the milling process and ferrite material powder (filler) was silane coupling agent treated, ferrite sintered magnet was manufactured, as is the same with examples 1 to 6, and evaluated thereof. In concrete, in example 8, except for not adding sorbitol and permolding fine milling to the coarse milled material, adding 1 wt % of silane coupling agent (KBM-503, KBM-1003 by Shin-Etsu Silicone Ltd.), with respect to the coarse milled material, to the milled slurry after the fine milling, and further mixing and permolding dispersant treatments for 0.5 hrs. in a wet ball mill, ferrite sintered magnet was obtained, as is the same with examples 1 to 6.

Example 9

In example 9, except for changing CIM to wet molding, ferrite sintered magnet was manufactured, as is the same with examples 1 to 6, and evaluated thereof. Namely, molding firing process in example 9 was performed as is described hereinafter.

First, fine milling was performed using toluene as dispersant; and milled slurry was obtained. When said fine milling was performed, 1.3 wt % of oleic acid with respect to coarse milled material was added. Solvent amount in the obtained slurry was adjusted in order to make solid content concentration to 74 to 76 mass %. The slurry was molded in a magnetic field by using a wet magnetic field molding device and making applied magnetic field to 1.2 T. And 30 mm diameter and 15 mm height of cylindrical molded body was manufactured. Next, after the obtained molded body was sufficiently dried at room temperature, firing was performed in air at 1200 to 1230° C. for 1 hour; and then a ferrite sintered magnet of sintered body was obtained.

Fluorescence X-ray quantitative analysis was performed to each ferrite sintered magnet in examples 1 to 9; and then it was confirmed that a composition of each ferrite sintered magnet was confirmed to be the composition respectively shown in Tables 1 to 9.

<Measurement of Magnetic Properties (Br, HcJ and Hk)>

First, density measurement was performed to each sample of examples 1 to 9 by Archimedes method. Next, top and bottom surfaces of each ferrite sintered magnet of examples 1 to 9 are processed; and then magnetic properties (residual flux density Br, coercive force HcJ, squareness ratio Hk/HcJ) were measured at 25° C. of air atmosphere using B—H tracer having 1989 kA/m of maximum applied magnetic field. Results are shown in Tables 1 to 9. Here, Hk is an external magnetic field strength when magnetic flux density becomes 90% of remanent flux density in the second quadrant of magnetic hysteresis loop.

<Degree of Crystal Orientation>

For each sample of sample number 1-4 of example 1, sample number 5-5 of example 5 and samples of examples 6 to 9, one surface of circular plated ferrite sintered magnet were smoothly polished, XRD (X-ray diffraction) measurement was performed (X-ray source: CuKα) to said smoothly polished surface, and diffraction peaks derived from the ferrite sintered magnet were identified. Degree of crystal orientation Or(f) of the sintered magnet was obtained from plane indices and peak strength of the identified diffraction peaks. Note that sample number 1-4 in Table 1 and sample number 5-4 in Table 5 are the same sample; therefore, degree of crystal orientation is also shown in the space of sample 5-4 in Table 5.

<Crystal Grain Size, Aspect Ratio>

Crystal grain size and aspect ratio of each ferrite sintered magnet were obtained as stated below.

First, cross-section parallel to c-axis (an easy axis of magnetization) direction of the ferrite sintered magnet were cut out, and then mirror polishing and etching treatment by hydrofluoric acid (concentration of 36%) were performed to the cross-section. Next, the etching treated surface was observed by scanning electron microscope (SEM) and a cross-sectional image of crystal grains was obtained. Cross-sectional image by SEM of sample number 1-4 (or 3-3, 4-4, 5-4, 7-8) and that of sample number 7-1 are respectively shown in FIGS. 3(a) and 3(b).

And then, an image analysis process was performed to the crystal grain cross-sectional image obtained by SEM observation; and with each crystal grains, as is shown in FIG. 2, maximum value "1" (μm) and minimum value "s" (μm) of crystal grain size, which go through a gravity center of cross-section of the crystal grains, were respectively measured. Using such method, maximum value "1" and minimum value "s" of crystal sizes of 500 crystal grains were obtained, arithmetic mean value (an average maximum grain size L) of the maximum values "1" and arithmetic mean value (an average minimum grain size "S") of the minimum values "s" were respectively calculated, and aspect ratio L/S was obtained from the average maximum grain size "1" and the average minimum grain size "s". The obtained average maximum grain size "L" and aspect ratio L/S are shown in Tables 1 to 9. Note that sample number 1-4 in Table 1 and sample number 5-4 in Table 5 are the same sample; therefore, average maximum grain size "L" and aspect ratio L/S are also shown in the space of sample 5-4 in Table 5.

Composition, magnetic property, degree of crystal orientation, crystal grain size and aspect ratio of each sample in examples 1 to 9 are all shown in Tables 1 to 9.

TABLE 1

Example 1

| Sample No. | Ratio of metal element constituting a ferrite sintered magnet | | | | | | z + m ((FeCo)/ (CaLaSrBa)) | La/Co | SiO$_2$ (mass %) | Magnetic Characteristic | | | Crystal Orientation Degree of Sintered Body | Average Maximum Particle Diameter L (μm) | Aspect Ratio L/S |
|---|---|---|---|---|---|---|---|---|---|---|---|---|---|---|---|
| | Ca 1 − w − x − y | La w | Sr x | Ba y | Fe z | Co m | | | | Br (mT) | HcJ (kA/m) | Hk/ HcJ (%) | | | |
| 1-1 | 0.601 | 0.398 | 0.0003 | 0.0008 | 9.25 | 0.25 | 9.50 | 1.60 | 0.65 | 467.0 | 262.4 | 42.5 | Not Measured | Not Measured | Not Measured |
| 1-1a | 0.551 | 0.398 | 0.050 | 0.0008 | 9.25 | 0.25 | 9.50 | 1.60 | 0.65 | 471.2 | 390.1 | 90.1 | 0.93 | Not Measured | Not Measured |
| 1-2 | 0.501 | 0.398 | 0.101 | 0.0008 | 9.25 | 0.25 | 9.50 | 1.59 | 0.65 | 472.3 | 391.9 | 90.5 | 0.94 | 1.38 | 2.38 |
| 1-3 | 0.473 | 0.398 | 0.129 | 0.0008 | 9.25 | 0.25 | 9.50 | 1.59 | 0.65 | 473.1 | 388.9 | 92.5 | 0.93 | Not Measured | Not Measured |
| 1-4 | 0.453 | 0.396 | 0.150 | 0.0008 | 9.25 | 0.25 | 9.50 | 1.59 | 0.65 | 471.4 | 404.3 | 91.4 | 0.92 | 1.36 | 2.35 |
| 1-5 | 0.448 | 0.395 | 0.156 | 0.0008 | 9.25 | 0.25 | 9.50 | 1.58 | 0.65 | 471.9 | 377.0 | 90.5 | 0.92 | Not Measured | Not Measured |
| 1-6 | 0.406 | 0.395 | 0.198 | 0.0008 | 9.25 | 0.25 | 9.50 | 1.58 | 0.65 | 471.0 | 390.5 | 91.1 | 0.92 | 1.33 | 2.26 |
| 1-6a | 0.354 | 0.395 | 0.250 | 0.0008 | 9.25 | 0.25 | 9.50 | 1.58 | 0.65 | 470.3 | 392.4 | 91.5 | 0.92 | Not Measured | Not Measured |
| 1-7 | 0.229 | 0.397 | 0.373 | 0.0008 | 9.25 | 0.25 | 9.50 | 1.59 | 0.65 | 468.9 | 360.9 | 92.7 | 0.91 | 1.29 | 2.24 |
| 1-8 | 0.149 | 0.396 | 0.4545 | 0.0008 | 9.25 | 0.25 | 9.50 | 1.59 | 0.65 | 464.9 | 303.3 | 94.5 | Not Measured | Not Measured | Not Measured |
| 1-9 | 0.033 | 0.396 | 0.5700 | 0.0008 | 9.25 | 0.25 | 9.50 | 1.59 | 0.65 | 463.5 | 211.1 | 99.7 | Not Measured | Not Measured | Not Measured |

✕Sample No. 1-4 of Table 1, Sample No. 3-3 of Table 3, Sample No. 4-4 of Table 4, Sample No. 5-4 of Table 5 and Sample No. 7-8 of Table 7 are the same samples.

TABLE 2

Example 2

| Sample No. | Ratio of metal element constituting a ferrite sintered magnet | | | | | | z + m ((FeCo)/ (CaLaSrBa)) | La/Co | SiO$_2$ (mass %) | Magnetic Characteristic | | | Crystal Orientation Degree of Sintered Body | Average Maximum Particle Diameter L (μm) | Aspect Ratio L/S |
|---|---|---|---|---|---|---|---|---|---|---|---|---|---|---|---|
| | Ca 1 − w − x − y | La w | Sr x | Ba y | Fe z | Co m | | | | Br (mT) | HcJ (kA/m) | Hk/HcJ (%) | | | |
| 2-1 | 0.716 | 0.180 | 0.103 | 0.0008 | 9.25 | 0.25 | 9.50 | 0.72 | 0.65 | 418.1 | 283.7 | 93.7 | Not Measured | Not Measured | Not Measured |
| 2-1a | 0.596 | 0.300 | 0.103 | 0.0008 | 9.25 | 0.25 | 9.50 | 1.20 | 0.65 | 468.0 | 390.4 | 90.7 | 0.91 | Not Measured | Not Measured |
| 2-2 | 0.546 | 0.349 | 0.104 | 0.0008 | 9.25 | 0.25 | 9.50 | 1.40 | 0.65 | 468.3 | 395.2 | 91.5 | 0.91 | 1.31 | 2.27 |

TABLE 2-continued

Example 2

| Sample No. | Ratio of metal element constituting a ferrite sintered magnet | | | | | | z + m ((FeCo)/ (CaLaSrBa)) | La/Co | SiO₂ (mass %) | Magnetic Characteristic | | | Crystal Orientation Degree of Sintered Body | Average Maximum Particle Diameter L (μm) | Aspect Ratio L/S |
| | Ca 1 − w − x − y | La w | Sr x | Ba y | Fe z | Co m | | | | Br (mT) | HcJ (kA/m) | Hk/HcJ (%) | | | |
|---|---|---|---|---|---|---|---|---|---|---|---|---|---|---|---|
| 2-3 | 0.503 | 0.395 | 0.101 | 0.0008 | 9.25 | 0.25 | 9.50 | 1.58 | 0.65 | 470.7 | 386.9 | 92.5 | 0.93 | 1.37 | 2.36 |
| 2-4 | 0.456 | 0.441 | 0.102 | 0.0008 | 9.25 | 0.25 | 9.50 | 1.77 | 0.65 | 471.8 | 398.3 | 91.9 | 0.95 | 1.35 | 2.35 |
| 2-4a | 0.422 | 0.475 | 0.102 | 0.0008 | 9.25 | 0.25 | 9.50 | 1.90 | 0.65 | 470.2 | 388.5 | 91.1 | 0.94 | Not Measured | Not Measured |
| 2-5 | 0.406 | 0.489 | 0.104 | 0.0008 | 9.25 | 0.25 | 9.50 | 1.96 | 0.65 | 471.8 | 367.7 | 90.8 | 0.94 | 1.34 | 2.37 |
| 2-6 | 0.346 | 0.550 | 0.103 | 0.0008 | 9.25 | 0.25 | 9.50 | 2.20 | 0.65 | 466.7 | 355.7 | 90.1 | Not Measured | Not Measured | Not Measured |
| 2-7 | 0.293 | 0.602 | 0.104 | 0.0008 | 9.25 | 0.25 | 9.50 | 2.41 | 0.65 | 465.5 | 331.7 | 94.5 | Not Measured | Not Measured | Not Measured |
| 2-8 | 0.236 | 0.662 | 0.101 | 0.0008 | 9.25 | 0.25 | 9.50 | 2.65 | 0.65 | 431.5 | 244.1 | 83.1 | Not Measured | Not Measured | Not Measured |

TABLE 3

Example 3

| Sample No. | Ratio of metal element constituting a ferrite sintered magnet | | | | | | z + m ((FeCo)/ (CaLaSrBa)) | La/ Co | SiO₂ (mass %) | Magnetic Characteristic | | | Crystal Orientation Degree of Sintered Body | Average Maximum Particle Diameter L (μm) | Aspect Ratio L/S |
| | Ca 1 − w − x − y | La w | Sr x | Ba y | Fe z | Co m | | | | Br (mT) | HcJ (kA/m) | Hk/HcJ (%) | | | |
|---|---|---|---|---|---|---|---|---|---|---|---|---|---|---|---|
| 3-1 | 0.453 | 0.391 | 0.155 | 0.0002 | 9.25 | 0.25 | 9.50 | 1.57 | 0.65 | 467.7 | 401.5 | 88.7 | 0.91 | 1.34 | 2.33 |
| 3-1a | 0.453 | 0.391 | 0.155 | 0.0004 | 9.25 | 0.25 | 9.50 | 1.57 | 0.65 | 470.0 | 405.9 | 90.1 | 0.92 | Not Measured | Not Measured |
| 3-2 | 0.453 | 0.391 | 0.155 | 0.0006 | 9.25 | 0.25 | 9.50 | 1.57 | 0.65 | 470.5 | 407.7 | 90.8 | 0.92 | Not Measured | Not Measured |
| 3-3 | 0.453 | 0.396 | 0.150 | 0.0008 | 9.25 | 0.25 | 9.50 | 1.59 | 0.65 | 471.4 | 404.3 | 91.4 | 0.92 | 1.36 | 2.35 |
| 3-4 | 0.451 | 0.394 | 0.154 | 0.0011 | 9.25 | 0.25 | 9.50 | 1.58 | 0.65 | 470.1 | 406.5 | 91.8 | 0.92 | Not Measured | Not Measured |
| 3-5 | 0.451 | 0.394 | 0.154 | 0.0017 | 9.25 | 0.25 | 9.50 | 1.58 | 0.65 | 470.6 | 407.4 | 90.6 | 0.93 | Not Measured | Not Measured |
| 3-6 | 0.451 | 0.392 | 0.154 | 0.0027 | 9.25 | 0.25 | 9.50 | 1.57 | 0.65 | 468.6 | 409.2 | 91.0 | 0.92 | 1.35 | 2.35 |
| 3-7 | 0.452 | 0.393 | 0.150 | 0.0045 | 9.25 | 0.25 | 9.50 | 1.58 | 0.65 | 467.6 | 409.1 | 91.6 | 0.92 | Not Measured | Not Measured |
| 3-8 | 0.451 | 0.394 | 0.149 | 0.0063 | 9.25 | 0.25 | 9.50 | 1.58 | 0.65 | 467.8 | 410.5 | 91.9 | 0.91 | Not Measured | Not Measured |
| 3-8a | 0.448 | 0.394 | 0.149 | 0.0100 | 9.25 | 0.25 | 9.50 | 1.58 | 0.65 | 468.3 | 403.4 | 92.0 | 0.91 | Not Measured | Not Measured |
| 3-9 | 0.452 | 0.392 | 0.145 | 0.0110 | 9.25 | 0.25 | 9.50 | 1.57 | 0.65 | 468.1 | 396.7 | 92.4 | 0.91 | 1.33 | 2.31 |
| 3-10 | 0.451 | 0.391 | 0.143 | 0.0150 | 9.25 | 0.25 | 9.50 | 1.57 | 0.65 | 461.0 | 376.0 | 88.2 | Not Measured | Not Measured | Not Measured |
| 3-11 | 0.594 | 0.392 | 0.005 | 0.0101 | 9.25 | 0.25 | 9.50 | 1.57 | 0.65 | 455.5 | 363.7 | 76.6 | Not Measured | Not Measured | Not Measured |

※Sample No. 1-4 of Table 1, Sample No. 3-3 of Table 3, Sample No. 4-4 of Table 4, Sample No. 5-4 of Table 5 and Sample No. 7-8 of Table 7 are the same samples.

TABLE 4

Example 4

| Sample No. | Ratio of metal element constituting a ferrite sintered magnet | | | | | | z + m ((FeCo)/ (CaLaSrBa)) | Co/ Fe m/z | SiO₂ (mass %) | Magnetic Characteristic | | | Crystal Orientation Degree of Sintered Body | Average Maximum Particle Diameter L (μm) | Aspect Ratio L/S |
| | Ca 1 − w − x − y | La w | Sr x | Ba y | Fe z | Co m | | | | Br (mT) | HcJ (kA/m) | Hk/HcJ (%) | | | |
|---|---|---|---|---|---|---|---|---|---|---|---|---|---|---|---|
| 4-1 | 0.454 | 0.396 | 0.149 | 0.0008 | 9.25 | 0.00 | 9.25 | 0 | 0.75 | 226.5 | 252.7 | 97.0 | Not Measured | Not Measured | Not Measured |
| 4-2 | 0.453 | 0.395 | 0.152 | 0.0008 | 9.25 | 0.11 | 9.36 | 0.012 | 0.72 | 450.5 | 387.7 | 95.5 | Not Measured | Not Measured | Not Measured |

TABLE 4-continued

Example 4

| | Ratio of metal element constituting a ferrite sintered magnet | | | | | | | Co/ | $SiO_2$ | Magnetic Characteristic | | | Crystal Orientation Degree of | Average Maximum Particle | Aspect |
|---|---|---|---|---|---|---|---|---|---|---|---|---|---|---|---|
| | Ca | | | | | | z + m | Fe | | | | | | | |
| Sample No. | 1 − w − x − y | La w | Sr x | Ba y | Fe z | Co m | ((FeCo)/ (CaLaSrBa)) | m/z | (mass %) | Br (mT) | HcJ (kA/m) | Hk/HcJ (%) | Sintered Body | Diameter L (μm) | Ratio L/S |
| 4-2a | 0.453 | 0.395 | 0.152 | 0.0008 | 9.25 | 0.19 | 9.44 | 0.020 | 0.72 | 465.8 | 400.8 | 92.6 | 0.93 | Not Measured | Not Measured |
| 4-3 | 0.454 | 0.396 | 0.149 | 0.0008 | 9.25 | 0.20 | 9.45 | 0.022 | 0.68 | 466.5 | 402.7 | 93.1 | 0.93 | 1.34 | 2.36 |
| 4-4 | 0.453 | 0.396 | 0.150 | 0.0008 | 9.25 | 0.25 | 9.50 | 0.027 | 0.65 | 471.4 | 404.3 | 91.4 | 0.92 | 1.36 | 2.35 |
| 4-4a | 0.453 | 0.396 | 0.150 | 0.0008 | 9.25 | 0.32 | 9.57 | 0.035 | 0.65 | 467.2 | 410.2 | 91.0 | 0.92 | Not Measured | Not Measured |
| 4-5 | 0.451 | 0.395 | 0.154 | 0.0008 | 9.25 | 0.37 | 9.62 | 0.040 | 0.60 | 463.5 | 419.7 | 92.4 | 0.92 | 1.33 | 2.30 |
| 4-6 | 0.453 | 0.395 | 0.151 | 0.0008 | 9.25 | 0.60 | 9.85 | 0.065 | 0.55 | 433.5 | 381.7 | 90.6 | Not Measured | Not Measured | Not Measured |
| 4-7 | 0.455 | 0.395 | 0.149 | 0.0008 | 9.25 | 0.70 | 9.95 | 0.076 | 0.50 | 420.5 | 276.7 | 80.5 | Not Measured | Not Measured | Not Measured |

※Sample No. 1-4 of Table 1, Sample No. 3-3 of Table 3, Sample No. 4-4 of Table 4, Sample No. 5-4 of Table 5 and Sample No. 7-8 of Table 7 are the same samples.

TABLE 5

Example 5

| | Ratio of metal element constituting a ferrite sintered magnet | | | | | | | La/ | $SiO_2$ | Magnetic Characteristic | | | Crystal Orientation Degree of | Average Maximum Particle | Aspect |
|---|---|---|---|---|---|---|---|---|---|---|---|---|---|---|---|
| | Ca | | | | | | z + m | Co | | | | | | | |
| Sample No. | 1 − w − x − y | La w | Sr x | Ba y | Fe z | Co m | ((FeCo)/ (CaLaSrBa)) | | (mass %) | Br (mT) | HcJ (kA/m) | Hk/HcJ (%) | Sintered Body | Diameter L (μm) | Ratio L/S |
| 5-1 | 0.457 | 0.395 | 0.147 | 0.0008 | 7.80 | 0.21 | 8.01 | 1.88 | 1.01 | 445.1 | 349.7 | 94.1 | Not Measured | Not Measured | Not Measured |
| 5-2 | 0.453 | 0.396 | 0.150 | 0.0008 | 8.62 | 0.23 | 8.85 | 1.70 | 0.91 | 465.1 | 381.0 | 94.0 | Not Measured | Not Measured | Not Measured |
| 5-2s | 0.453 | 0.396 | 0.150 | 0.0008 | 8.72 | 0.23 | 8.95 | 1.70 | 1.05 | 465.7 | 419.3 | 92.0 | 0.92 | 1.29 | 2.28 |
| 5-2a | 0.453 | 0.396 | 0.150 | 0.0008 | 8.80 | 0.23 | 9.03 | 1.70 | 0.91 | 470.0 | 383.1 | 93.8 | 0.92 | Not Measured | Not Measured |
| 5-3 | 0.454 | 0.395 | 0.150 | 0.0008 | 9.01 | 0.24 | 9.25 | 1.63 | 0.75 | 470.3 | 383.8 | 93.3 | 0.93 | 1.30 | 2.36 |
| 5-4 | 0.453 | 0.396 | 0.150 | 0.0008 | 9.25 | 0.25 | 9.50 | 1.59 | 0.65 | 471.4 | 404.3 | 91.4 | 0.92 | 1.36 | 2.35 |
| 5-5 | 0.454 | 0.395 | 0.150 | 0.0008 | 9.45 | 0.26 | 9.70 | 1.55 | 0.57 | 470.5 | 410.7 | 91.5 | 0.92 | 1.33 | 2.34 |
| 5-5a | 0.454 | 0.395 | 0.150 | 0.0008 | 9.60 | 0.26 | 9.86 | 1.55 | 0.57 | 470.6 | 398.5 | 90.9 | 0.92 | Not Measured | Not Measured |
| 5-6 | 0.452 | 0.396 | 0.150 | 0.0008 | 9.71 | 0.26 | 9.97 | 1.52 | 0.50 | 471.3 | 379.4 | 91.5 | 0.92 | 1.36 | 2.35 |
| 5-7 | 0.453 | 0.395 | 0.151 | 0.0008 | 9.97 | 0.27 | 10.24 | 1.48 | 0.35 | 462.5 | 355.3 | 91.5 | Not Measured | Not Measured | Not Measured |
| 5-7a | 0.453 | 0.395 | 0.151 | 0.0008 | 9.88 | 0.27 | 10.15 | 1.48 | 0.63 | 466.1 | 411.2 | 90.6 | 0.92 | 1.34 | 2.33 |
| 5-8 | 0.455 | 0.392 | 0.152 | 0.0008 | 10.40 | 0.28 | 10.68 | 1.41 | 0.30 | 466.0 | 349.8 | 88.2 | Not Measured | Not Measured | Not Measured |
| 5-9 | 0.454 | 0.396 | 0.150 | 0.0008 | 11.40 | 0.29 | 11.69 | 1.36 | 0.30 | 466.0 | 291.8 | 88.2 | Not Measured | Not Measured | Not Measured |
| 5-10 | 0.454 | 0.395 | 0.150 | 0.0008 | 12.10 | 0.32 | 12.42 | 1.23 | 0.30 | 461.5 | 230.7 | 91.5 | Not Measured | Not Measured | Not Measured |

※Sample No. 1-4 of Table 1, Sample No. 3-3 of Table 3, Sample No. 4-4 of Table 4, Sample No. 5-4 of Table 5 and Sample No. 7-8 of Table 7 are the same samples.

TABLE 6

Example 6

| | Ratio of metal element constituting a ferrite sintered magnet | | | | | | | La/ | $SiO_2$ | Magnetic Characteristic | | | Crystal Orientation Degree of | Average Maximum Particle | Aspect |
|---|---|---|---|---|---|---|---|---|---|---|---|---|---|---|---|
| | Ca | | | | | | z + m | Co | | | | | | | |
| Sample No. | 1 − w − x − y | La w | Sr x | Ba y | Fe z | Co m | ((FeCo)/ (CaLaSrBa)) | | (mass %) | Br (mT) | HcJ (kA/m) | Hk/HcJ (%) | Sintered Body | Diameter L (μm) | Ratio L/S |
| 6-1 | 0.455 | 0.398 | 0.147 | 0.0008 | 9.21 | 0.25 | 9.46 | 1.61 | 1.07 | 446.5 | 379.7 | 92.5 | Not Measured | Not Measured | Not Measured |
| 6-2 | 0.455 | 0.398 | 0.147 | 0.0008 | 9.22 | 0.25 | 9.46 | 1.61 | 0.87 | 465.9 | 404.1 | 91.3 | 0.92 | 1.31 | 2.30 |
| 6-3 | 0.455 | 0.398 | 0.147 | 0.0008 | 9.22 | 0.25 | 9.46 | 1.61 | 0.72 | 472.2 | 389.5 | 91.5 | 0.92 | 1.34 | 2.35 |

TABLE 6-continued

Example 6

| | Ratio of metal element constituting a ferrite sintered magnet | | | | | | | | Magnetic Characteristic | | | Crystal Orientation | Average Maximum Particle | Aspect |
|---|---|---|---|---|---|---|---|---|---|---|---|---|---|---|
| | Ca | | | | | | z + m | | | | | Degree of | | |
| Sample No. | 1 − w − x − y | La w | Sr x | Ba y | Fe z | Co m | ((FeCo)/ (CaLaSrBa)) | La/ Co | SiO$_2$ (mass %) | Br (mT) | HcJ (kA/m) | Hk/HcJ (%) | Sintered Body | Diameter L (μm) | Ratio L/S |
| 6-4 | 0.455 | 0.398 | 0.147 | 0.0008 | 9.21 | 0.25 | 9.46 | 1.61 | 0.67 | 474.3 | 375.7 | 90.5 | 0.93 | 1.38 | 2.37 |
| 6-5 | 0.455 | 0.398 | 0.147 | 0.0008 | 9.22 | 0.25 | 9.46 | 1.61 | 0.47 | 475.5 | 291.2 | 77.9 | 0.95 | 1.49 | 2.51 |
| 6-6 | 0.468 | 0.381 | 0.150 | 0.0007 | 8.97 | 0.25 | 9.22 | 1.54 | 0.90 | 467.4 | 421.5 | 90.0 | 0.92 | Not Measured | Not Measured |
| 6-7 | 0.468 | 0.381 | 0.150 | 0.0007 | 8.97 | 0.25 | 9.22 | 1.54 | 0.83 | 469.7 | 434.4 | 90.8 | 0.92 | 1.36 | 2.33 |
| 6-8 | 0.468 | 0.381 | 0.150 | 0.0007 | 8.97 | 0.25 | 9.22 | 1.54 | 0.78 | 471.5 | 397.7 | 91.5 | 0.92 | Not Measured | Not Measured |

TABLE 7

Example 7

| | Ratio of metal element constituting a ferrite sintered magnet | | | | | | | SiO$_2$ | Organic component amounts in Formed Body (vol %) | Magnetic Characteristic | | | Crystal Orientation Degree of Sintered Body | Average Maximum Particle Diameter L (μm) | Aspect Ratio L/S |
|---|---|---|---|---|---|---|---|---|---|---|---|---|---|---|---|
| Sample No. | Ca 1 − w − x − y | La w | Sr x | Ba y | Fe z | Co m | z + m ((FeCo)/ (CaLaSrBa)) | (mass %) | | Br (mT) | HcJ (kA/m) | Hk/ HcJ (%) | | | |
| 7-1 | 0.453 | 0.396 | 0.150 | 0.0008 | 9.25 | 0.25 | 9.50 | 0.58 | 50 | 477.6 | 301.0 | 93.5 | 0.95 | 1.53 | 2.46 |
| 7-2 | 0.453 | 0.396 | 0.150 | 0.0008 | 9.25 | 0.25 | 9.50 | 0.58 | 48 | 475.2 | 360.2 | 94.1 | 0.94 | 1.38 | 2.39 |
| 7-3 | 0.453 | 0.396 | 0.150 | 0.0008 | 9.25 | 0.25 | 9.50 | 0.58 | 45 | 471.0 | 376.1 | 91.8 | 0.92 | 1.37 | 2.38 |
| 7-4 | 0.453 | 0.396 | 0.150 | 0.0008 | 9.25 | 0.25 | 9.50 | 0.58 | 44 | 468.2 | 390.1 | 92.0 | 0.91 | 1.32 | 2.31 |
| 7-5 | 0.453 | 0.396 | 0.150 | 0.0008 | 9.25 | 0.25 | 9.50 | 0.58 | 42 | 392.0 | 409.5 | 78.5 | 0.75 | 1.30 | 2.28 |
| 7-6 | 0.453 | 0.396 | 0.150 | 0.0008 | 9.25 | 0.25 | 9.50 | 0.65 | 50 | 478.5 | 326.4 | 92.2 | 0.95 | 1.47 | 2.39 |
| 7-7 | 0.453 | 0.396 | 0.150 | 0.0008 | 9.25 | 0.25 | 9.50 | 0.65 | 48 | 476.0 | 385.5 | 93.9 | 0.94 | 1.37 | 2.35 |
| 7-8 | 0.453 | 0.396 | 0.150 | 0.0008 | 9.25 | 0.25 | 9.50 | 0.65 | 45 | 471.4 | 404.3 | 91.4 | 0.92 | 1.36 | 2.35 |
| 7-9 | 0.453 | 0.396 | 0.150 | 0.0008 | 9.25 | 0.25 | 9.50 | 0.65 | 44 | 468.4 | 414.8 | 92.6 | 0.92 | 1.30 | 2.29 |
| 7-10 | 0.453 | 0.396 | 0.150 | 0.0008 | 9.25 | 0.25 | 9.50 | 0.65 | 42 | 394.2 | 433.1 | 80.3 | 0.78 | 1.25 | 2.24 |

※Sample No. 1-4 of Table 1, Sample No. 3-3 of Table 3, Sample No. 4-4 of Table 4, Sample No. 5-4 of Table 5 and Sample No. 7-8 of Table 7 are the same samples.

TABLE 8

Example 8

| | Ratio of metal element constituting a ferrite sintered magnet | | | | | | | SiO$_2$ | Organic component amounts in Formed Body (vol %) | Magnetic Characteristic | | | Crystal Orientation Degree of Sintered Body | Average Maximum Particle Diameter L (μm) | Aspect Ratio L/S |
|---|---|---|---|---|---|---|---|---|---|---|---|---|---|---|---|
| Sample No. | Ca 1 − w − x − y | La w | Sr x | Ba y | Fe z | Co m | z + m ((FeCo)/ (CaLaSrBa)) | (mass %) | | Br (mT) | HcJ (kA/m) | Hk/ HcJ (%) | | | |
| 8-1 | 0.454 | 0.395 | 0.150 | 0.0006 | 9.08 | 0.24 | 9.32 | 0.74 | 45 | 476.0 | 410.1 | 94.4 | 0.96 | 1.28 | 2.18 |
| 8-2 | 0.453 | 0.397 | 0.150 | 0.0009 | 9.12 | 0.24 | 9.36 | 0.69 | 45 | 477.7 | 398.6 | 95.1 | 0.95 | 1.31 | 2.26 |

TABLE 9

Example 9

| | Ratio of metal element constituting a ferrite sintered magnet | | | | | | | | Magnetic Characteristic | | | Crystal Orientation | Average Maximum Particle | Aspect |
|---|---|---|---|---|---|---|---|---|---|---|---|---|---|---|
| | Ca | | | | | | z + m | | SiO$_2$ | | | Degree of | | |
| Sample No. | 1 − w − x − y | La w | Sr x | Ba y | Fe z | Co m | ((FeCo)/ (CaLaSrBa)) | La/Co | (mass %) | Br (mT) | HcJ (kA/m) | Hk/HcJ (%) | Sintered Body | Diameter L (μm) | Ratio L/S |
| 9-1 | 0.454 | 0.395 | 0.150 | 0.0008 | 9.30 | 0.24 | 9.54 | 1.64 | 0.66 | 471.9 | 385.1 | 90.5 | 0.92 | 1.35 | 2.32 |
| 9-2 | 0.471 | 0.385 | 0.143 | 0.0011 | 9.00 | 0.25 | 9.24 | 1.57 | 0.84 | 466.0 | 424.8 | 90.1 | 0.92 | 1.31 | 2.29 |

Table 1 proves that, when Sr ratio (x) is over 0.0003 and less than 0.373 and Ca ratio (1-w-x-y) is over 0.229 and less than 0.601, a high Hk/HcJ can be obtained while maintaining good Br and HcJ. Table 1 further proves that, when Sr ratio (x) is 0.05 to 0.25 and Ca ratio (1-w-x-y) is 0.354 to 0.551, higher Hk/HcJ can be obtained while maintaining good Br and HcJ.

Table 2 proves that, when La ratio (w) is over 0.180 and less than 0.550 and La/Co (w/m) is over 0.72 and less than 2.20, a high Hk/HcJ can be obtained while maintaining good Br and HcJ. Table 2 further proves that, when La ratio (w) is 0.3 or more and less than 0.5 and La/Co (w/m) is 1.2 to 1.9, higher Hk/HcJ can be obtained while maintaining good Br and HcJ.

Table 3 proves that, when Ba ratio (y) is over 0.0001 and less than 0.0150, a high Hk/HcJ can be obtained while maintaining good Br and HcJ. Further, it was confirmed that sample 3-11, wherein Sr ratio (x) is smaller than Ba ratio (y) is insufficient, particularly in view of Br and Hk/HcJ. Table 3 further proves that when Ba ratio (y) is 0.0004 to 0.01, higher Hk/HcJ can be obtained while maintaining good Br and HcJ.

Table 4 proves that, when Co/Fe(m/z) is over 0.012 and less than 0.065, high Hk/HcJ can be obtained while maintaining good Br and HcJ. Table 4 further proves that when Co/Fe(m/z) is 0.020 to 0.035, high Hk/HcJ can be obtained while maintaining good Br and HcJ.

Table 5 proves that, when Fe ratio(z) is over 8.62 and less than 9.97, high Hk/HcJ can be obtained while maintaining good Br and HcJ. Table 5 further proves that when Fe ratio(z) is 8.8 to 9.6, high Hk/HcJ can be obtained while maintaining good Br and HcJ.

As is shown in Table 6, in the ferrite magnetic material, when ratio y1 mass % of Si component with respect to $SiO_2$ is shown on Y-axis, total amount x1 of z and m is shown on X-axis, and relation between x1 and y1 is within a range surrounded by 4 points a(8.9, 1.2), b(8.3, 0.95), c(10.0, 0.35) and d(10.6, 0.6) shown on the X-Y coordinate having X and Y axes, high Hk/HcJ can be obtained while maintaining good Br and HcJ.

Table 7 proves that degree of crystal orientation $Or(f)=\Sigma(001)/\Sigma(hkl)$ obtained from X-ray diffraction measurement in the ferrite magnetic material is over 0.78, high Hk/HcJ can be obtained while maintaining good Br and HcJ.

Further, it was confirmed from Table 7 that, in the ferrite magnetic material, an average maximum grain size L is less than 1.47 or L/S is less than 2.46, high HcJ can be obtained.

Table 8 proves that even when silane coupling agent treated ferrite magnetic powder is used, high Hk/HcJ can be obtained while maintaining good Br and HcJ.

Table 9 proves that even when samples obtained by wet molding are used, high Hk/HcJ can be obtained while maintaining good Br and HcJ.

DESCRIPTION OF THE SYMBOLS

2 . . . magnetic field injection molding device
8 . . . mold
10 . . . pellet
12 . . . cavity
20 . . . crystal grains

The invention claimed is:
1. A ferrite magnetic material, in which its main phase comprises:
a ferrite phase having a hexagonal crystal structure, and metal element composition constituting the ferrite magnetic material is expressed by the following formula (1),

$$Ca_{1-w-x-y}R_wSr_xBa_yFe_zM_m \quad (1)$$

wherein:
R in formula (1) is at least one element selected from the group consisting of rare-earth element, including Y, and Bi, which at least includes La,
M in formula (1) is at least one element selected from the group consisting of Co, Mn, Mg, Ni, Cu, and Zn, which at least includes Co,
w, x, y, z, and m in formula (1) respectively satisfies the following formulas (2), (3), (4), (5), (6), (7) and (8)

$$.25 \leq w \leq 0.5 \quad (2)$$

$$0.01 \leq x \leq 0.35 \quad (3)$$

$$0.0001 \leq y \leq 0.013 \quad (4)$$

$$y < x \quad (5)$$

$$8.7 \leq z \leq 9.9 \quad (6)$$

$$1.0 < w/m < 2.1 \quad (7)$$

$$0.017 < m/z < 0.055 \quad (8), \text{ and}$$

an Si component is at least included as a sub-component, and wherein;
when content y1 mass % of the Si component in the ferrite magnetic material, with respect to $SiO_2$, is shown on Y-axis and a total content x1 of z and m is shown on X-axis, a relation between x1 and y1 is within a range surrounded by 4 points a(8.9, 1.2), b(8.3, 0.95), c(10.0, 0.35) and d(10.6, 0.6), placed on X-Y coordinate having the X and Y axes,
residual flux density Br is from 392.0 to 478.5 mT, coercive force HcJ is from 301.0 to 434.4 kA/m, and squareness ratio Hk/HcJ is from 78.5% to 95.1%.

2. A ferrite magnet comprising the ferrite magnetic material as set forth in claim 1.

3. The ferrite magnet as set forth in claim 2, wherein a degree of crystal orientation $Or(f)=\Sigma(001)/\Sigma(hkl)$ obtained by X-ray diffraction measurement is 0.9 or more.

4. The ferrite magnet as set forth in claim 2, wherein:
within a cut surface of crystal grains constituting the ferrite magnet, which is cut by a plane parallel to c-axis direction of hexagonal crystal structures, maximum and minimum values of a grain size which go through a gravity center of each grain in a crystal cross-section are respectively obtained, and when an average of said maximum and minimum values of the sizes in crystal grains of a predetermined number or more are respectively determined as L(μm) and S(μm),
said L and S satisfy the below formulas (9) and (10):

$$L \leq 1.4 \quad (9)$$

$$L/S \leq 2.4 \quad (10).$$

5. A ferrite sintered magnet comprising the ferrite magnetic material as set forth in claim 1.

6. The ferrite sintered magnet as set forth in claim 5, wherein a degree of crystal orientation $Or(f)=\Sigma(001)/\Sigma(hkl)$ obtained by X-ray diffraction measurement is 0.9 or more.

7. The ferrite sintered magnet as set forth in claim 5, wherein:

within a cut surface of crystal grains constituting the ferrite magnet, which is cut by a plane parallel to c-axis direction of hexagonal crystal structures, maximum and minimum values of a grain size which go through a gravity center of each grains in a crystal cross-section are respectively obtained, and when an average of said maximum and minimum values of the sizes in crystal grains of a predetermined number or more are respectively determined as $L(\mu m)$ and $S(\mu m)$, said L and S satisfy the following formulas (9) and (10):

$$L \leq 1.4 \quad (9)$$

$$L/S \leq 2.4 \quad (10).$$

* * * * *